E. C. D'YARMETT.
PROCESS OF PRODUCING FUEL.
APPLICATION FILED MAR. 24, 1916.
1,376,925.  Patented May 3, 1921.
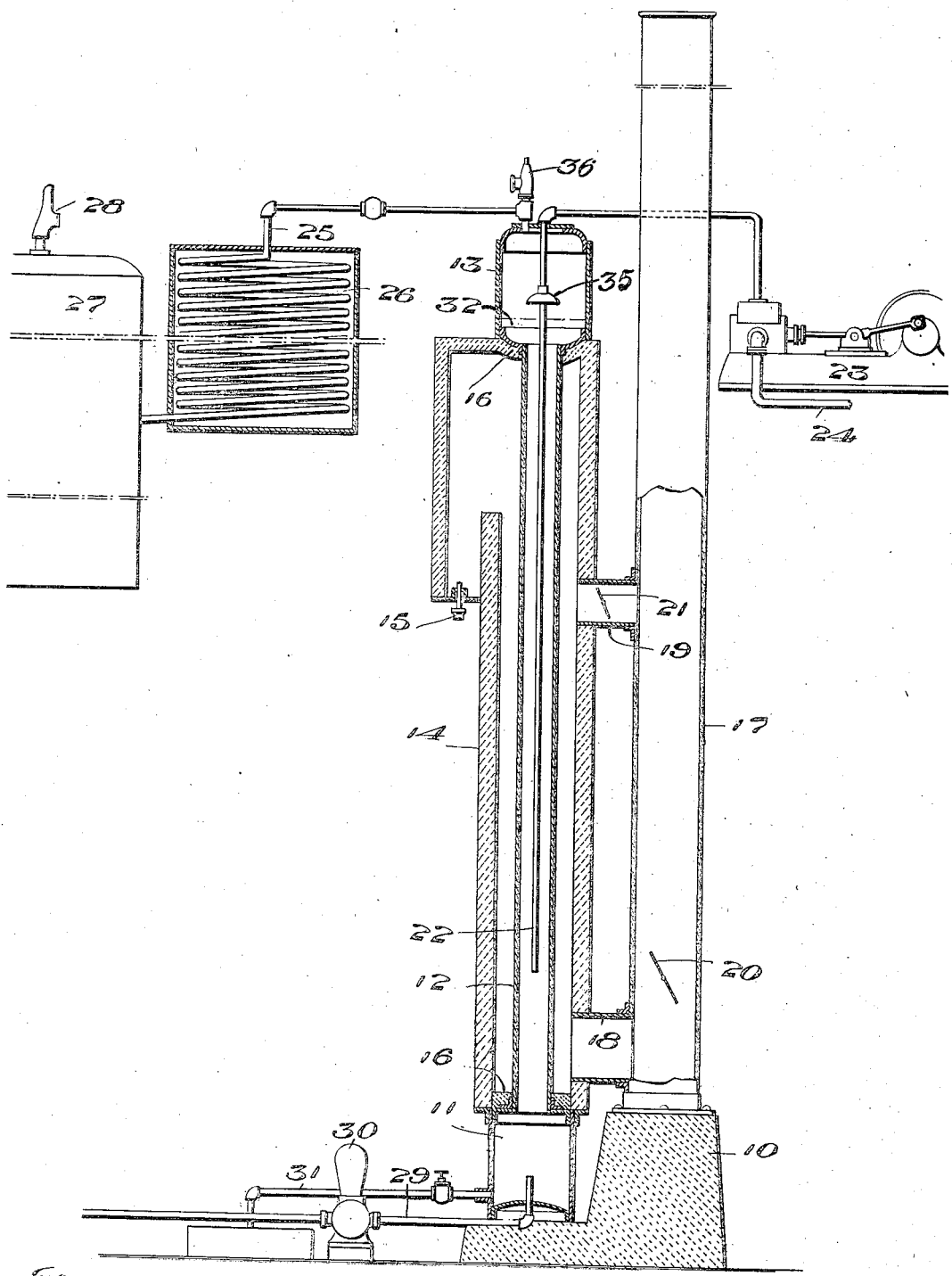

UNITED STATES PATENT OFFICE.

EDWARD C. D'YARMETT, OF MUSKOGEE, OKLAHOMA.

PROCESS OF PRODUCING FUEL.

1,376,925.  Specification of Letters Patent.  Patented May 3, 1921.

Application filed March 24, 1916. Serial No. 86,525.

*To all whom it may concern:*

Be it known that I, EDWARD C. D'YARMETT, a citizen of the United States, residing at Muskogee, in the county of Muskogee and State of Oklahoma, have invented new and useful Improvements in Processes of Producing Fuel, of which the following is a specification.

This invention relates to fuel, and more particularly to the method of making the same.

One of the main objects of this invention is to derive from heavy hydrocarbons, such as crude petroleum, and a hydrocarbon gas, such as casing-head gas, or the like, a maximum amount of light hydrocarbon oils, such as gasolene, by mixing or blending the vapors of the heavy hydrocarbon and the gases in accordance with this invention.

It is a further object of the invention to provide an improved fuel which may be produced at a relatively low cost, the fuel having characteristics very similar to gasolene, and if desired, a fuel superior in quality to the grade of gasolene now generally sold on the market may be obtained. By proceeding in accordance with my invention, a fuel may be obtained which is remarkable in quality and calorific value and which possesses great efficiency in that the same amount of my improved fuel will perform a greater amount of work under the same conditions of operation than a like amount of gasolene of the grade now sold on the market. The gasolene is particularly adapted for use in internal combustion engines.

My invention consists broadly in the process of vaporizing or distilling a heavy hydrocarbon, such as crude petroleum, mixing or blending therewith a suitable hydrocarbon gas, such as natural gas or gas from oil wells (known as casing-head gas) the vaporizing and blending being conducted under such suitable pressures and at such temperatures as may be found necessary under the particular conditions under which my process is carried out, and then condensing and cooling the mixed gases and vapors while under pressure.

I have found that excellent results are obtained when the gas used is of such a character that the molecules thereof contain a larger relative proportion of hydrogen atoms than the molecules of the vaporized petroleum, the combining of such a gas to the petroleum vapor giving a very high grade fuel.

In the accompanying drawings, I have illustrated the apparatus for carrying my invention into practical use, a description of the process for producing my improved fuel using the illustrated apparatus being sufficiently descriptive of such process when other apparatus are employed for carrying the same into effect. In this drawing the apparatus is shown in vertical cross-section.

10 designates a base or foundation upon which is positioned a reservoir or chamber 11 from the top of which rises a tubular cylinder or column 12, the column being secured to the upper plate of the chamber in any suitable fluid-tight manner. Positioned upon the top of the cylinder or column 12 and having communication therewith is a drum 13 forming an upper chamber, although this drum, if desired, may be dispensed with, and the column 12 extended upwardly so that the space in the column above the level of the liquid therein may take the place of the drum 13. About the cylinder or column 12, and extending between the chambers 11 and 13 is a flue or stand-pipe 14 constructed of any suitable refractory material. The flue or stand-pipe adjacent its upper end is provided with a fire-box having, in the present instance, a burner 15. The particular manner of heating my improved apparatus is immaterial however, and either oil or gas may be supplied to the burner, or if desired, a grate may be provided within the fire-box on which coal or the like may be burned. The upper wall or plate of the reservoir or lower chamber 11 and the lower plate of the drum 13 are covered by or protected with a suitable refractory material as at 16, so that the flames or heat, passing through the flue from the burner 15, do not directly heat either of these chambers. Passing from the bottom end of the flue at a point adjacent the lower chamber 11 to a stack 17 is a flue-pipe 18, and a second flue-pipe 19 connects the flue and stack at an intermediate point between the ends of the flue, dampers 20 and 21 being provided to shut off either of the flue-pipes as desired.

Extending downwardly through the upper chamber or drum 13 and into the central cylinder 12 and terminating at a point just above the lower end of the latter, is an inlet pipe 22 leading from a suitable gas compressor 23, the latter being illustrated conventionally, as the particular construction of the same forms no part of this invention. The compressor is connected up to a pipe 24 which leads from a suitable source of supply of casing-head or natural gas, and, if desired, the same may lead directly from the field from which the gas is obtained. 35 designates a baffle plate which prevents the heavy hydrocarbon from escaping in a liquid state from the chamber 13. The pipe 22 externally of the upper chamber or drum 13 may be provided with any suitable pressure regulators, check valves, and the like, it being deemed in the present instance, unnecessary to show the same as it is understood that any forms of such devices may be supplied. 25 designates an outlet pipe leading from the upper portion of the upper chamber 13 to a suitable condenser or cooling device, in the present instance, the same being shown conventionally as comprising a cooling coil 26, one end of which is connected up to a receiving tank or reservoir 27, and this reservoir is provided with a suitable pressure-relief valve 28. 36 designates a pressure valve which relieves excessive pressures within the chamber 13. The bottom chamber or reservoir 11 has an inlet pipe 29 leading from a suitable source of heavy hydrocarbon or crude petroleum, a pump 30 of any approved type being inserted into the line to force the crude oil under pressure into the chamber 11 and the cylinder or column 12. The residue, such as tarry matters, or the like, which settles out from the crude petroleum is drained from the chamber 11 through an opening or pipe 31.

When it is desired to place the apparatus disclosed in the drawing into operation, crude petroleum under pressure is pumped from the field, or source of supply, through the pipe 29 into the lower compartment 11 and the cylinder or column 12, the level of the liquid being designated as at 32. The burner 15 is lighted, and the flame and heated gases rising therefrom pass into the flue and downwardly therein around the central cylinder or column 12, through the flue-pipe 18 or 19 to the stack 17, the latter being of sufficient height to create a good draft and draw the flame and heated gases through the flue. Compressed casing-head gas or other suitable hydrocarbon gas is forced into the pipe 22 and issues at the lower open end thereof into the cylinder 12 and the gases, after they escape from the pipe, rise within the liquid in the central cylinder and thoroughly commingle therewith, so that the hydrocarbon vapors which result from the heating of the liquid hydrocarbon and the hydrocarbon gas are brought into intimate contact with each other, and thus a chemical or blending action takes place. In the space provided above the surface of the liquid, in the present instance, the space within the drum 13, the vapors and gases are further commingled and blended together, and then pass through the pipe 25 to the cooling apparatus 26 where condensation takes place and the condensates pass over into the receiving tank 27. The pressure relief valve 28 maintains a suitable pressure within the cooling device, the upper drum, and upon the surface of the liquid, thus maintaining or regulating the pressure of the compressor 23, the pressure device being adjustable so that any desired pressure may be obtained, and at the same time the relief valve permits any gases which have not combined with the condensates to pass off to any suitable place. It is probable that due to the temperature and pressure under which my process is carried out a cracking process of the gas and vapors of the liquid hydrocarbon takes place, that is to say, the higher homologues of the substances break down into the lower homologues thereby producing a resultant blended mixture of light liquid hydrocarbons. The exact chemical action which takes place in my process is not quite understood, but by experiments, I am led to believe that it is due to this cracking action of both the gas and the vapors of the liquid which result in a fuel having the characteristics heretofore described.

It will further be noted that by positioning the burner 15 adjacent the upper end of the flue, the upper end of the cylinder or column 12 containing the liquid hydrocarbon is heated to a higher temperature than the lower end thereof, and, therefore, the fluids as they pass upwardly through the central cylinder pass into zones of gradually higher temperatures whereby the tarry and resinous substances within the oil are caused to settle out and discoloration of or the introduction of deleterious substances into the resultant condensates of fuel is obviated.

One of the essential features of my improved process is that the same must be carried out under pressure, and, of course, the pressure may be varied according to the particular grade of hydrocarbons used and the particular grade of resultant fuel which it is desired to produce, and it is evident that the pressure will vary with crude petroleum found in different localities. I have found that admirable results are obtained in some cases by using a pressure of two-hundred and fifty pounds to a square inch. Furthermore, the particular temperature at which my process is carried out may be varied, and the pressure and temperature may be selected which give a resultant fuel having properties of remarkable quality and which is vastly superior to gasolene.

If desired, of course, a fuel of lower grade may be obtained depending on the use to which the resultant fuel is to be put.

I find that by actual experience that when I maintain the pressure in the still at about 175 pounds per square inch, and heat the crude oil to a temperature ranging from 600 to 700° F. practically all of the oil will be broken up and will yield a very good grade of motor fuel.

It is, of course, obvious that my invention is susceptible of various modifications which would be within the spirit of the invention without departing from the scope of the following claims, and that I do not wish to limit myself to the particular form of apparatus herein described.

What I claim is:—

1. The process which consists in introducing natural gas under pressure into a body of heated hydrocarbon liquid, permitting the vapors of the liquid and gas to commingle above said liquid under pressure appreciably higher than atmospheric pressure, and subsequently cooling and condensing any condensable portions of the blended mixture resulting therefrom.

2. The process which consists in introducing a hydrocarbon gas under pressure into the lower portion of a body of liquid hydrocarbon, maintaining the upper portion of said body of liquid at a higher temperature than the lower portion thereof, thereby gradually raising the temperature of said gas as it passes upwardly through said liquid, permitting the vapors of the hydrocarbon and gas to commingle above said body, and subsequently cooling and condensing the condensable portions of the resultant mixture.

3. The process which consists in heating a relatively long column of hydrocarbon liquid under pressure, introducing a hydrocarbon gas under pressure into the hydrocarbon liquid near the base of the column, causing the gas to rise through said liquid, heating the upper end of the column to a higher temperature than the lower end thereof, thereby gradually raising the temperature of the gas and the liquid during the passage of the gas through the liquid, and subsequently cooling and condensing the condensable portions of the blended mixture of oil, vapors and gases.

4. The process which consists in heating a relatively long column of hydrocarbon liquid under pressure, introducing a hydrocarbon gas under pressure into the hydrocarbon liquid near the base of the column, causing the gas to rise through said liquid, heating the upper end of the column to a higher temperature than the lower end thereof, thereby gradually raising the temperature of the gas and the liquid during the passage of the gas through the liquid, causing the vapors of the hydrocarbon liquid and the gas to thoroughly commingle under pressure above the surface of the liquid, and subsequently cooling and condensing the condensable portions of the blended mixture of oil, vapors and gas.

5. The process which consists in applying to the upper portion of a relatively long vertical column of hydrocarbon liquid under pressure heat sufficient to cause cracking, the lower portion of the column being heated to a lower temperature, introducing into the body of said liquid hydrocarbon natural gas under pressure, causing the gas and vapors to thoroughly commingle under pressure appreciably higher than atmospheric pressure above the surface of the liquid and subsequently cooling and condensing the condensable portions of the blended mixture of cracked oil and gas vapors.

6. The process which consists in heating a body of hydrocarbon liquid to a temperature sufficient to cause cracking; introducing under pressure into said liquid hydrocarbon a hydrocarbon gas whose molecule contains a larger relative proportion of hydrogen atoms than the molecule of the vapors of said liquid; permitting the gas and vaporized hydrocarbon to commingle in a space above the surface of the liquid; maintaining a pressure appreciably higher than atmospheric pressure within said space; and subsequently cooling and condensing the condensable portions of the blended mixture resulting therefrom.

In testimony whereof I have hereunto set my hand in presence of two subscribing witnesses.

EDWARD C. D'YARMETT.

Witnesses:
 GERTRUDE M. STUCKER,
 T. CLAY LINDSEY.